(12) United States Patent
Kanungo et al.

(10) Patent No.: US 8,370,337 B2
(45) Date of Patent: Feb. 5, 2013

(54) RANKING SEARCH RESULTS USING CLICK-BASED DATA

(75) Inventors: Tapas Kanungo, Redmond, WA (US); Kumaresh Pattabiraman, Bellevue, WA (US); Nitin Agrawal, Redmond, WA (US); Kieran Richard McDonald, Seattle, WA (US); Christopher Avery Meyers, Kirkland, WA (US); Nipoon Malhotra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 12/762,929

(22) Filed: Apr. 19, 2010

(65) Prior Publication Data

US 2011/0258149 A1    Oct. 20, 2011

(51) Int. Cl.
*G06F 7/00*     (2006.01)
*G06F 17/30*    (2006.01)

(52) U.S. Cl. ........................................ 707/723; 707/732

(58) Field of Classification Search .................. None
See application file for complete search history.

(56) References Cited

U.S. PATENT DOCUMENTS

| | | | |
|---|---|---|---|
| 2006/0122979 A1* | 6/2006 | Kapur et al. | ........................ 707/3 |
| 2007/0038601 A1 | 2/2007 | Guha | |
| 2007/0038620 A1 | 2/2007 | Ka et al. | |
| 2008/0215563 A1 | 9/2008 | Shi et al. | |
| 2009/0265290 A1 | 10/2009 | Ciaramita et al. | |
| 2009/0265338 A1 | 10/2009 | Kraft et al. | |
| 2010/0318546 A1* | 12/2010 | Kenthapadi et al. | ........... 707/759 |

OTHER PUBLICATIONS

Dupret et al., "A Model to estimate Intrinsic Doucument Relevance from the Clickthrough Logs of Web Search Engine", WSDM '10, pp. 181-190, Feb. 2010, ACM.*
Radlinski et al., "Active Exploration for Learning Rankings from Clicktrhough Data", KDD '07, pp. 570-579, Aug. 2007, ACM.*
Agichtein et al., "Improving Web Search Ranking by Incorporating User Behavior Information", SIGIR '06, pp. 19-26, 2006, ACM.*
Cen et al., "Study on the Click Context of Web Search Users for Reliability Analysis", AIRS 2009, LCNS 5839, pp. 397-408, 2009, SPringer-Verlag Berlin Heidelberg.*
Cormode et al., "Semantics of Ranking Queries for Probabilistic Data and Expected Ranks", IEEE 25th International Conference on Data Engineering, ICDE '09, pp. 305-316, IEEE, 2009.*
Arlind Kopliku, "Aggregated Search: Potential, Issues and Evaluation"; 30 pages; Technical Report: IRIT/RT-2009-4-FR; Published Sep. 2009; Institut de Recherche en Informatique de Toulouse; http://www.irit.fr/PERSONNEL/SIG/kopliku/publications/Technical%20report-Aggregated%20search%20.pdf.
Fernando Diaz, "Integration of News Content into Web Results"; 10 pages; WSDM '09 Feb. 9-12, 2009, Barcelona, Spain; ACM 978-1-60558-390-7; http://wsdm2009.org/papers/p182-diaz.pdf.

(Continued)

*Primary Examiner* — Michael Hicks
(74) *Attorney, Agent, or Firm* — Shook, Hardy & Bacon L.L.P.

(57) ABSTRACT

Methods and computer-storage media having computer-executable instructions embodied thereon that facilitate generating a machine-learned model for ranking search results using click-based data are provided. Data is referenced from user queries, which may include search results generated by general search engines and vertical search engines. A training set is generated from the search results and click-based judgments are associated with the search results in the training set. Based on click-based judgments, identifiable features are determined from the search results in a training set. Based on determining identifiable features in a training set, a rule set is generated for ranking subsequent search results.

18 Claims, 7 Drawing Sheets

OTHER PUBLICATIONS

Pavel Braslavski, "Marrying Relevance and Genre Rankings: an Exploratory Study"; Published 2008; 19 pp.; Institute of Engineering Science RAS, Komsomolskaya 34, Ekaterinburg, Russia; http://www.kansassu/pb/paper/genresontheweb.pdf.

Jaime Arguello, et al., "Classification-Based Resource Selection"; 10 pages; in proceedings of the 18th ACM Conference on Information and Knowledge Management (CIKM '09) Hong Kong; CIKM '09, Nov. 2-6, 2009; Hong Kong, China; ACM 978-1-60558-512-3/09111.

Jaime Arguello, et al., "Sources of Evidence for Vertical Selection"; in proceedings of the Thirty Second Annual International ACM SIGIR Conference on Research and Development in Information Retrieval, Boston 2009; SIGIR '09, Jul. 19-23, 2009; Boston, Massachusetts; pp. 315-322; ACM 978-1-60558-483-6/09/07.

Jaime Arguello, et al., "Adaptation of Offline Vertical Selection Predictions in the Presence of User Feedback"; 8 pages; SIGIR '09, Jul. 19-23, 2009; Boston, Massachusetts; ACM 978-1-60558-483-6/09/07.

Milad Shokouhi, et al.; "Robust Results Merging Using Sample-Based Score Estimates"; ACM Transactions on Information Systems (TOIS) vol. 27, Issue 3; May 2009; 29 pages; ISSN: 1046-8188; DOI 10.1145/1508850-1508852.

Luo Si, et al., "Modeling Search Engine Effectiveness for Federated Search", SIGIR '05, Aug. 15-19, 2005; 8 pages; Salvador, Brazil; ACM 1-59593-034-5/5/0008.

Luo Si, et al., "CLEF 2005: Multilingual Retrieval by Combining Multiple Multilingual Ranked Lists"; In Sixth Workshop of the Cross-Language Evaluation Forum, CLEF 2005; 12 pages; Vienna, Austria.

Luo Si, et al., "Unified Utility Maximization Framework for Resource Selection"; 10 pages; In Proceedings of the Thirteenth International Conference on Information and Knowledge Management; CIKM '04, Nov. 8-13, 2004; Washington, DC; ACM 1-58113-874-1//04/0011.

Paul Thomas, et al., "SUSHI: Scoring Scaled Samples for Server Selection"; SIGIR '09, Jul. 19-23, 2009; 8 pages; Boston, Massachusetts; ACM 978-1-60558-483-6/09/07.

Milad Shokouhi, et al., "Using query logs to establish vocabularies in distributed information retrieval"; Elsevier, www.elsevier.com/locate/infoproman; Information Processing and Management; vol. 43, Issue 1; 2007; pp. 169-180; School of Computer Science and Information Technology, RMIT University, Melbourne 3001, Australia.

Panagiotis G. Ipeirotis, et al., "Classification-Aware Hidden-Web Text Database Selection"; 66 pages; ACM Transactions on Information Systems, vol. 26, No. 2, Article 6, Mar. 2008; ACM 1046-8188/2008/03-ART6.

Budi Yuwono, et al., "Server Ranking for Distributed Text Retrieval Systems on the Internet"; 9 pages; World Scientific Press; Fifth International Conference on Database Systems for Advanced Applications; Melbourne, Australia; Apr. 1-4, 1997.

Jamie Callan, et al., "SIGIR 2003 Workshop on Distributed Information Retrieval"; 5 pages; SIGIR Forum, vol. 37, No. 2 (2003); http://www.cs.cmu.edu/~callan/Workshops/dir03/.

Vanessa Murdock, et al., "Workshop on Aggregated Search"; 4 pages; SIGIR Workshop Report; ACM SIGIR Forum, vol. 42, No. 2, Dec. 2008.

* cited by examiner

RANKING SEARCH RESULTS USING CLICK-BASED DATA

BACKGROUND

Search results are generally presented on a webpage, such as a search results webpage, in response to a user query. These search results may contain any number of different types of results gathered from a variety of sources. For example, a search results webpage may display general, textual search results gathered from general search engines, or particular types of search results retrieved from vertical search engines. Search results webpages use a variety of methods to determine which search results are most relevant in response to a query, and how to display such results to a user. Accordingly, a determination is made regarding how to interlink different types of search results, such as general textual results and specific, vertical-search results, for presentation to a user.

In some instances, a search results webpage may utilize a pre-determined framework for organizing search results. This framework may be implemented using a machine-learned model that directs the display of results based on previously-determined user preferences. Despite the advantages that exist for using machine-learned models to determine the selection and placement of search results, improvements may still be made, such as, for instance, in the method for ranking search results for implementation in machine-learning frameworks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to ranking search results using click-based data. Data is referenced from a user data set. A user data set may include user queries, the search results of user queries, query-result pairs, and click-based data from previously-generated search results. The search results of user queries in a user data set may be obtained from general search engines, vertical search engines, and the like. Search results of user queries, referenced from the user data set, are used to generate training sets of data from which to gather click-based judgments. Click-based judgments are associated with the search results in a training set. Based on satisfying a threshold, user queries may be categorized as either head queries or tail queries. Click-based judgments may be associated directly with the search results of head queries. The search results of tail queries may be aggregated into a "class" of queries that are associated with click-based judgments. Based on associating click-based judgments with the search results in a training set, identifiable features are determined for the user query. Such identifiable features may relate to clicks only on textual web results, clicks on vertical query results, clicks on captions and URLs of query-URL pairs, query classification confidence, vertical confidence, overall clicks on the entire webpage, clicks on advertisements, and clicks on links to see the next page of results. Based on associating click-based judgments with identifiable features for a user query, a rule set is created for the particular user query. In embodiments, a particular click-based judgment is associated with each identifiable feature extracted from the training set data. Having associated click-based judgments with the identifiable features of a user query, a rule set is used to rank subsequent search results for the same user query that have the same or similar identifiable features. The rule set may be used to implement a machine-learned method for ranking search results.

BRIEF DESCRIPTION OF THE DRAWINGS

The present invention is described in detail below with reference to the attached drawing figures, wherein.

DETAILED DESCRIPTION

Figure 1:
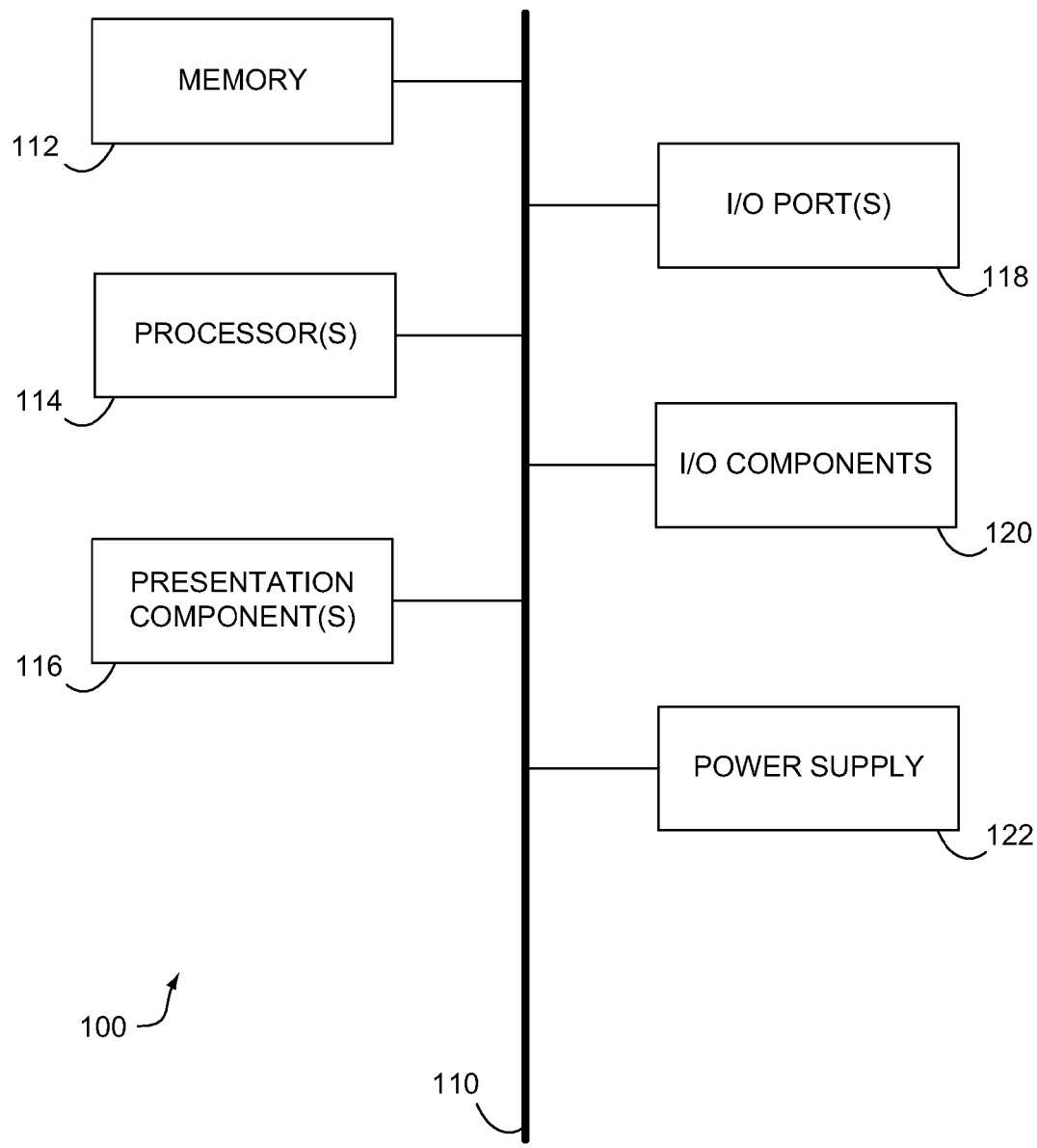
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to a machine-learned model for ranking search results using click-based data. Click-based data refers to any number of metrics or comparisons relating to search results presented to a user. For example, click-based data may be measurements based on a user's selection or manipulation of one or more search results. Click-based data may also be referred to as a "click-through rate" for a search result. As used herein, a user is any user that accesses search results, and may refer to a single user or multiple users. Click-based data used to rank search results may be derived from any number of sources, and may relate to a variety of characteristics of the search results. By way of example only, and not limitation, click-based data may be derived from the number of times a user selects, or "clicks on," a particular search result in a search result list. In embodiments, click-based data may be derived from the number of times a user clicks on a particular search result when it is presented in the context of other particular search results. Still further examples of click-based data include the manipulation of search results in the context of other "fixed" search results on a webpage. As such, click-based data may reflect a variety of measurements regarding a user's preferences for a particular search result, either presented in isolation or in combination with other results.

Click-based judgments are generated using a training set of user data. The search results of one or more user queries are referenced from a user data set. As used herein, "referencing" refers to the accessing, retrieving, obtaining, and/or downloading of data. Referencing may occur automatically, or in response to a request from a user, such as a request from a client device. Referenced search results may include search results generated in response to a particular user query. In embodiments, referencing search results from a user data set includes referencing data generated by general search engines, vertical search engines, and the like. General search engines refer to search engines that generate general search results in response to a user query, such as, for example, textual search results. General search engine results may be categorized based on the type of general search results generated by the general search engine. Vertical search engines refer to search engines that generate specific types of search results in response to a user query, such as, for example, images, video, pictures, news items, and the like. Search results generated by a vertical search engine may generally be referred to as "verticals." For example, an "image vertical" is a type of search result generated by a vertical search engine.

Accordingly, in one aspect, an embodiment of the present invention is directed to one or more computer-readable media storing computer-useable instructions that, when used by one or more computing devices, causes the one or more computing devices to perform a method of generating a machine-learned model for ranking search results using click-based data. The method comprises referencing data from one or more user queries, wherein the data is referenced from one or more of a general search engine and a vertical search engine; generating a training set of data, wherein the training set comprises one or more search results extracted from the data; associating one or more click-based judgments with each of the one or more search results in the training set; based on associating one or more click-based judgments with each of the one or more search results in the training set, determining one or more identifiable features from the training set; and based on determining one or more identifiable features, generating a rule set for ranking subsequent search results of one or more user queries In another embodiment, an aspect of the invention is directed to a method performed by one or more server devices for ranking search results. The method comprises referencing data from one or more user queries, wherein the data comprises one or more of general search engine results and vertical search engine results; generating a training set, wherein the training set comprises one or more search results extracted from the data; associating one or more click-based judgments with each of the one or more search results in the training set; determining one or more identifiable features from the training set based on the associated one or more click-based judgments; and based on determining one or more identifiable features from the training set, generating a rule set for ranking search results.

A further embodiment of the present invention is directed to one or more computer-readable media storing computer-useable instructions that, when used by one or more computing devices, causes the one or more computing devices to perform a method for ranking search results using click-based data. The method comprises referencing data from one or more user queries, wherein the data is referenced from one or more of general search engines and vertical search engines; generating a training set of data, wherein the training set comprises a plurality of search results from the data, further wherein the plurality of search results comprises one or more of a general search engine result and a vertical search engine result; and associating one or more click-based judgments with the plurality of search results in the training set based on (1) determining whether one or more user queries is a head query, wherein a head query satisfies a threshold for the data referenced from one or more user queries; (2) associating one or more click-based judgments directly with each of the plurality of search results for the one or more head queries in the training set; (3) determining whether one or more user queries is a tail query, wherein a tail query satisfies a threshold for the data referenced from one or more user queries; (4) aggregating the plurality of search results of one or more tail queries into one or more classes of queries; and (5) associating one or more click-based judgments with each of the plurality of search results in the one or more classes of queries in the training set. The method further comprises, based on associating the one or more click-based judgments with each of the plurality of search results in the training set, determining one or more identifiable features from the training set, wherein the one or more identifiable features comprise at least one of clicks on only textual search results, clicks on vertical search results, clicks on captions and URLs of query-URL pairs, query classification confidence, vertical query confidence, overall clicks on the entire webpage, clicks on advertisements, and clicks on links to see the next page of results; appending an absolute numerical value to each of the one or more identifiable features; generating a rule set based on the one or more identifiable features of the one or more user queries; and utilizing the rule set to rank subsequent search results.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention.

Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As indicated previously, embodiments of the present invention are directed to a machine-learned model for ranking search results using click-based data. Click-based judgments are generated using a training set of referenced user data. User data is referenced from a user data set that may include user queries, the search results of user queries, query-result pairs, and click-based data from previously-generated search results. The search results of user queries in a user data set may be obtained from general search engines, vertical search engines, and the like.

In embodiments, referencing user data includes referencing the search results of one or more user queries. As such, the search results of one or more user queries may include general search results from a general search engine and vertical search results from a vertical search engine. In further embodiments, user data may be referenced from a single type of search engine, such as referencing user data from one or more vertical search engines. By way of example only, and not limitation, user data referenced for the user query "movies," may include search results from a vertical search engine that generates images. For the same user query "movies," search results may be referenced from a vertical search engine that generates videos. Such images and videos generated by vertical search engines in response to a user query for "movies" may be referenced as part of a training set of user data. As such, an exemplary training set for the user query "movies" may contain any number of different types of vertical search results.

A training set refers to a collection of user data referenced from one or both of general search results and vertical search results for a user query. Referenced user data in a training set are presented to a judge and used to elicit click-based judgments. Click-based judgments are gathered for the user data in a training set to determine how to rank the search results of user queries. Click-based judgments, or click-based feedback, may relate to a judge's preferences based on click-based data for particular search results referenced from the user data set. A click-based judgment refers to a judgment regarding a search result based on previously-generated click-based data. In embodiments, as included in the user data set, previously generated click-based data may be associated with the search results of a user query. As such, click-based data may be associated with the search results in a training set such that a click-based judgment is derived, at least in part, from previously generated click-based data. By way of example only, and not limitation, a search result with over 1,000 clicks from previously-generated click-based data may be included in a training set of data. Based on this particular search result's click-based data, a click-based judgment may be associated with the particular search result.

In embodiments, a training set of search results for a particular user query is presented to a human judge to elicit feedback regarding the particular search results presented in the training set. As such, a training set of search results for the user query "movies" may be presented to a human judge and used to elicit click-based feedback on the training set. For example, a user query for "movies" may include a video clip of a popular new movie, a news item regarding a recently released movie, an image of a local movie theatre, and a textual web result showing the phone number and address of a local movie theatre. Such search results for the user query "movies" may be referenced and included in a training set of user data for use in eliciting click-based feedback. Upon presenting a training set of such user data to a human judge, click-based judgments may be generated with regard to the particular video clip, news item, image, textual result, and phone number and address results.

Click-based judgments are elicited from a single judge or multiple judges. In embodiments, click-based judgments are elicited with respect to a single training set of user data for a single user query. Alternatively, click-based judgments may be elicited with respect to multiple training sets of user data for the same user query, or multiple search results compiled in the same training set. Click-based judgments may be associated directly with user data in a training set. In embodiments, associating one or more click-based judgments with one or more search results in a training set includes 1) determining that one or more user queries is a head query, and 2) associating one or more click-based judgments directly with each of the one or more search results for the head query. As used herein, a head query refers to a user query that satisfies a threshold for the user data referenced from one or more user queries. A threshold for a head query may refer to meeting or exceeding a specific number of times a particular user query appears in a user data set. A head query may refer to a user query that occurs a particular number of times in a determined amount of time, such as, for instance, a user query that occurs 100 times in user data collected over a period of one month.

Click-based judgments may also be associated indirectly with search results in a training set. In embodiments, associating one or more click-based judgments with the plurality of search results in the training set includes 1) determining that one or more user queries is a tail query, 2) aggregating the search results of one or more tail queries into one or more classes of queries, and 3) associating one or more click-based judgments with the search results of the one or more classes of queries in the training set. As used herein, a tail query refers to a query that satisfies a threshold for the user data referenced from one or more user queries. A threshold for a tail query may refer to failing to exceed the minimum number of times for a user query to appear in referenced user data. For example, a tail query may refer to a user query that occurs infrequently in a determined amount of time, such as, for instance, occurring fewer than 50 times in referenced user data over a time period of 1 month. Alternatively, a threshold for a tail query may be based on the number of variations of misspellings of the query term for a particular user query. In embodiments, the search results of tail queries are aggregated into a class of queries such that click-based judgments may be generated with respect to the results of the entire class of queries.

Click-based results are used to associate identifiable features with training set data. As used herein, "identifiable features" refer to characteristics of the results of user queries. Determining identifiable features that are associated with the search results of a user query in a training set of user data, as will be discussed later, facilitates establishing a rule set for later ranking of search results. For example, determining the identifiable features for the user query "movies," based on click-based feedback from a training set of search results for the query "movies," facilitates the ranking of search results of a subsequent, "real time" user query for the term "movies." Having previously determined identifiable features associated with the user query "movies," a machine-learned model may determine, "on the fly," which results are most relevant to a subsequent user query based on the previously identified features.

Identifiable features may reflect any number of different characteristics or preferences for search results provided in response to a user query. As such, identifiable features may include clicks on only textual search results, clicks on vertical search results, clicks on captions and URLs of query-URL pairs, query classification confidence, vertical query confidence, overall clicks on the entire webpage, clicks on advertisements, clicks on links to see the next page of results, and other features of user queries identified based on click-based judgments. In embodiments, identifiable features may be associated with training sets that include the search results of one or both of head queries and tail queries. For example, with respect to classes of queries generated for tail queries, identifiable features may be determined with respect to user queries that occur infrequently in a user data set. Similarly, for tail queries that are often misspelled when entered into search engines, identifiable features may be associated with the intended user query.

The identifiable feature characterized as "clicks on only textual search results" refers to when a user "clicks" on or selects only textual search results for a user query. For example, a user may be presented with a training set of different types of search results, including general textual results, images, video, and advertisements. A user may consistently select textual search results instead of the alternate types of vertical search results presented in response to the same user query. As such, an identifiable feature for the user query may be that a user prefers general textual search results for that user query, as compared to other types of search results.

Similarly, clicks on vertical search results may reflect, as an identifiable feature for a user query, that users consistently select vertical search results instead of general, textual results, for a particular user query. For example, for the query "movies," click-based data gathered from search results for the query "movies" may indicate that users consistently select images from a search result list of potential results. In embodiments, click-based data generated with respect to a particular type of vertical search results may indicate a user's preference for one type of vertical search result over another type of vertical search result, such as, for example, preferring an image search result over a video search result for a particular user query.

Clicks on captions and URLs of query-URL pairs refers to the selection of one or both of a caption portion and a URL portion of a search result. In embodiments, a query-URL pair refers to a URL presented in association with a search result, in response to a user query. For example, clicks on captions and URLs of query-URL pairs may refer to a user's selection of a URL displayed in association with a textual search result, a vertical search result, and the like. Alternatively, clicks on captions and URLs of query-URL pairs may refer to a user's selection of a caption presented in association with a search result, such as a textual result or a vertical search result.

As used herein, query classification confidence refers to the probability that a user query is a member of a specific class of queries, such as, for instance, "adult" queries, "nutrition" queries, "retail" queries, "image" queries, "video" queries, or "local" queries. In embodiments, a specific class of queries is determined by evaluating the user query text and comparing it to a group of queries that fall into that specific class of queries. For example, a particular user query for "shoe store" may be categorized as a "retail" query by virtue of the user query text "shoe store" being part of a group of queries already categorized into a "retail" query class.

Vertical query confidence refers to the probability that the user query relates to a specific vertical search result, such as an "image" or "video," as determined by evaluating the vertical search results returned for a user query by one or more vertical search engines. For example, video and image results returned in response to a user query may be evaluated to determine which results are most relevant to a particular user query. Alternatively, web results returned in response to a user query may be evaluated to determine which results include the words "image" or "video."

As used herein, overall clicks on the entire webpage refers to the percentage of time that the user clicks on anything on the page presented to them. For example, overall clicks on the entire webpage may relate to the selection of general textual results, vertical search results, advertisements presented on a display next to a search result list, and the like.

Clicks on advertisements refers to the percentage of time that a user clicks on one or more advertisements presented to a user. In embodiments, clicks on advertisements relates to the number of times an advertisement is clicked on by a user, as compared to the number of times different types of search results are clicked on by a user for the same or similar user queries.

Clicks on links to see the next page of results refers to the percentage of time that a user is unsatisfied by a page of search results presented to the user and therefore clicks on the pagination links on the screen to present a subsequent page of results to the user. For example, if the results presented on "page 1" of a search results webpage are not relevant to the user, the user may click on the "page 2" or "page 3" pagination links at the bottom of a page.

As will be understood, other "identifiable features" may be associated with search results, based on feedback from click-based judgments. Such identifiable features may relate to any number of different features that may be elicited from a training set of user data. In embodiments, identifiable features are associated with search results in a training set based on click-based judgments. Based on associating identifiable features with the search results of a training set, a particular click-based judgment may be associated with the identifiable features of a user query. Associating a particular click-based judgment refers to associating one or more specific click-based judgments with the identifiable features of a user query such that the query may be characterized for subsequent search result ranking. For example, based on multiple "clicks" on image search results, a particular click-based judgment may be associated with image search results for the user query "movies." As such, an identifiable feature for image results may be associated with the query "movies." Further, based on determining this identifiable feature for the user query "movies," a particular click-based judgment may be associated with the identifiable feature such that, for subsequent searches for "movies," the click-based judgment may be used to rank the subsequent search results. As such, a click-based judgment may be associated with a subsequent search that includes results with the same identifiable feature. Associating a particular click-based judgment with an identifiable feature may be demonstrated by the following table:

| IDENTIFIABLE FEATURES | CLICK-BASED JUDGMENTS |
| --- | --- |
| General Textual Results Only | 6 |
| Vertical Results Only | 2 |
| Query-URL pairs | 4 |

As the table suggests, identifiable features are determined, and associated with particular click-based judgments. Particular click-based judgments associated with an identifiable feature may be appended with an absolute numerical value, as shown above. As used herein, "appending" refers to replacing, adding on, or associating an absolute numerical value with an identifiable feature or a click-based judgment. For example, the click-based judgments above for the identifiable feature of "General Textual Results Only," may be associated with a click-based judgment having an absolute numerical value of "6." In embodiments, an absolute numerical value appended to a click-based judgment is based on a scale of numerical values associated with the particular click-based judgments. For example, a training set of user data that elicits 530 clicks on general textual results, 200 clicks on vertical results, and 350 clicks on query-URL pairs, may be appended with scaled numerical values such that each identifiable feature is associated with the numerical values of 6, 2, and 4, respectively.

Numerical values may also be appended to identifiable features, such that similar results may be represented as:

| IDENTIFIABLE FEATURES | CLICK-BASED JUDGMENTS |
| --- | --- |
| 1 | 6 |
| 2 | 2 |
| 3 | 4 |

Based on associating identifiable features with particular click-based judgments, a regression may be performed to determine a user's preferences for subsequently displayed search results. In embodiments, thresholds may be determined for the location of search results based on click-based judgments associated with identifiable features. For example, as shown above, for identifiable feature "1," with a click-based judgment value of "6," a threshold may be established such that click-based judgments in excess of "5" designate that the particular type of search result should be placed at the top of a list of results on a search results webpage.

In addition to generating click-based judgments for a training set of data, human-based judgments may also be elicited for the search results in a training set. A human-based judgment refers to a judgment assigned to a particular search result based on direct feedback from one or more human individuals. For instance, as associated with human-based judgments, pre-determined user preferences may be assigned to a particular type of search result. This human-based judgment may be distinct from click-based judgment associated with the same search result in the training set. For example, while a click-based judgment for the user query "movies" may indicate that users click on images more often than other types of search result, a human-based judgment may be associated with the same query directing that general textual results are the preferred type of search results for that query.

In embodiments, the proportion of human-based judgments and click-based judgments associated with a training set may be adjusted. For instance, the following equation may be used to adjust the proportion of human-based judgments and click-based judgments associated with a training set of data:

$$TOTAL=(\alpha)X+(1-\alpha)Y$$

In the equation above, the value of $\alpha$ is adjusted between 0 and 1, which in turn adjusts the proportion of each type of judgment for the "TOTAL" search results in a training set. As used herein, "X" refers to human-based judgments associated with one or more search results in the training set. The term "Y" represents click-based judgments associated with one or more search results in the training set. In embodiments, the proportions of click-based and human-based judgments may be adjusted based on the type of search results being ranked and the availability of human judges from whom to elicit such judgments. For example, in the case of a product that is moving into a new market, there may be very few clicks on a new product such that click-based judgments may not accurately reflect a user's interest in the product. However, by generating human-based judgments, the same search results may be characterized based on user preferences without the need for click-based data. Further, identifiable features may be determined based on the relative proportions of human-based judgments and click-based judgments for the search results in a training set.

Based on determining identifiable features from a training set of search results, a rule set may be generated for ranking search results. In embodiments, a particular click-based judgment may be associated with each of the one or more identifiable features, from which a rule set may be generated. As used herein, a rule set refers to the associating of identifiable features with a training set of user data. In embodiments, a machine-learning model utilizes a rule set to rank search results based on previously generated click-based judgments of identifiable features extracted from search results. Utilizing such rule sets, predictions may be made regarding what judgments would be elicited regarding a subsequent set of search results. For instance, a rule set based on identifiable features of the user query "movies" may later be utilized to indicate which subsequent search results are most relevant to a user. As such, user queries that produce results with similar identifiable features may be ranked, without needing to elicit click-based judgments for a subsequent set of search results.

Figure 2:
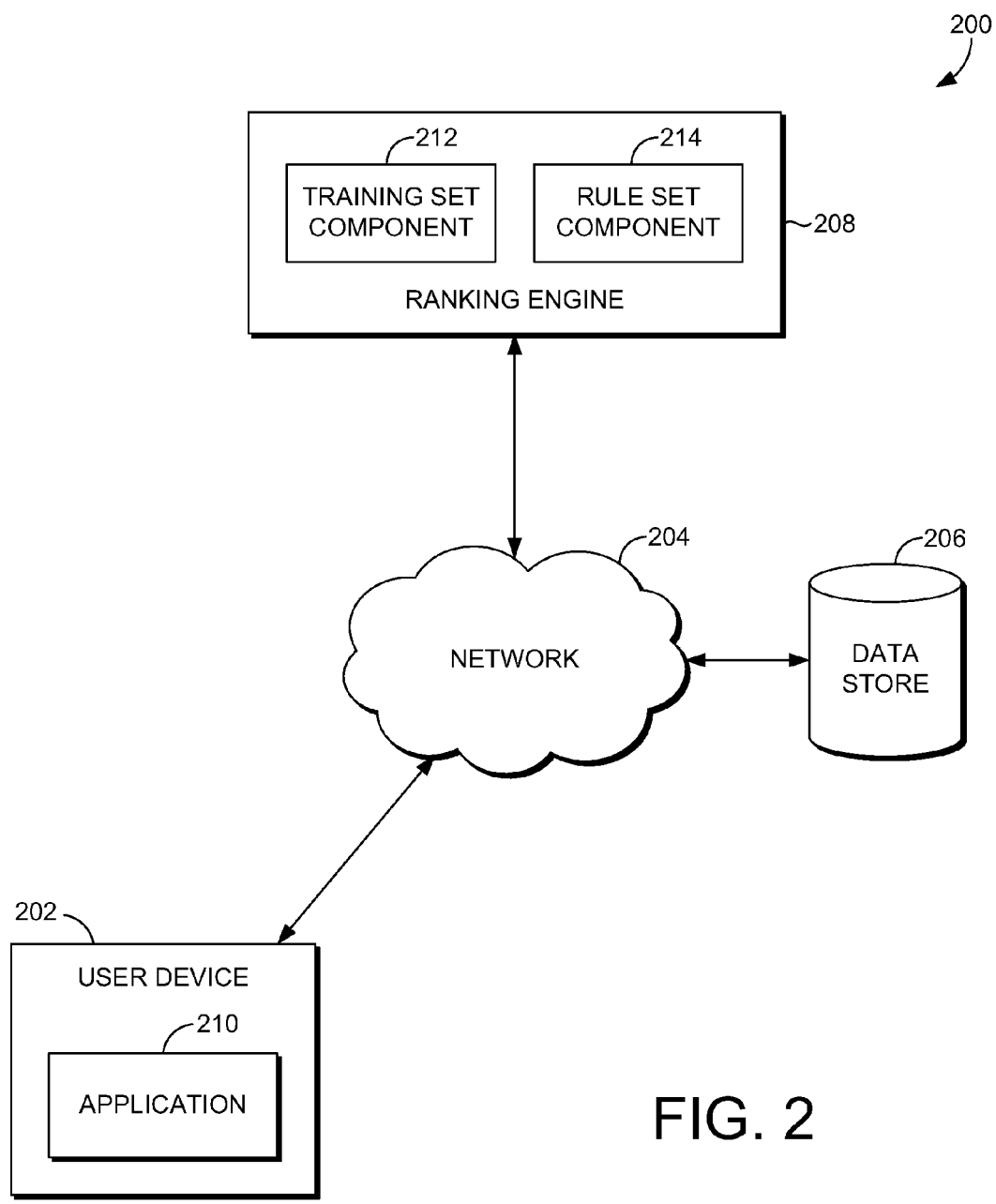
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 generally includes a user device 202, a network 204, a data store 206, and a ranking engine 208. The user device 202, data store 206, and ranking engine 208 may each include any type of computing device, such as computing device 100 described with reference to FIG. 1, for example. The components of the system 200 may communicate with each other via network 204, which may include, without limitation, one or more local area networks (LANs) and/or wide area networks (WANs). Such networking environments are commonplace in offices, enterprise-wide computer networks, intranets, and the Internet. It should be understood that any number of user devices, data stores, and ranking engines may be employed within the system 200 within the scope of the present invention. Each may comprise a single device or multiple devices cooperating in a distributed environment. For instance, the ranking engine 208 may comprise multiple devices arranged in a distributed environment that collectively provide the functionality of the ranking engine described herein. Additionally, other components not shown may also be included within the system 200.

Generally, the system 200 illustrates an environment in which the user device 202 references data from the ranking engine 208, such as, for instance, by requesting and receiving ranked search results from the ranking engine 208. The user device 202 may be any of a number of different types of devices owned and operated by a user, such as, for instance, a desktop computer, a laptop computer, or a mobile device, such as a phone or media player. The user device 202 includes an application 210 that provides an environment for presenting or displaying search results. The application 210 may comprise any type of application in which search results are displayed. By way of example only and not limitation, the application may be a web browsing application, which may display search results on a search results webpage.

Ranked search results may be presented within the application 210 when the user device 202 references the ranking engine 208. In some instances, one or more search results may be referenced by the user device 202. The ranking engine 208 comprises a system for utilizing click-based judgments to generate rules associated with the subsequent display of search results, such as, for instance, in a machine-learning framework for ranking search results. The ranking engine 208 might generate a rule or set of rules using click-based judgments elicited from users.

As noted above, the ranking engine 208 may comprise a single computing device, although it's likely that the ranking engine 208 would be implemented via multiple computing devices in a distributed computing environment. As shown in FIG. 2, the ranking engine 208 includes a training set component 212 that utilizes click-based judgments of search results to determine identifiable features for a user query. These identifiable features may be associated with particular click-based judgments. The identifiable features determined in training set 212 are subsequently used by rule set component 214. Rule set component 214 is associated with subsequent displays of search results.

In embodiments, the ranking engine 208 utilizes training set component 212 to elicit click-based judgments. In such a case, ranking engine 208 references data store 206 to generate a training set of user data. Referencing user data from data store 206 may be done through network 204. Such user data may include search results from general search engines and/or vertical search engines. Training set component 212 is used to gather click-based judgments to determine one or more identifiable features associated with the search results in a training set of user data. As such, the search results of referenced user data are compiled in training set component 212 and presented to a judge for feedback. In this case, a judge presented with a training set of user data provides judgments regarding the search results in the training set.

A training set generated by training set component 212 may be accessed by a judge that serves the function of providing click-based judgments on a training set of user data. A judge may be presented with a single or multiple instances of a training set generated by training set component 212. A judge may be presented with a single search result for providing feedback. Alternatively, a judge may be presented with multiple search results compiled by training set component 212. Click-based judgments might be collected and stored within a database. Such a database might reside within the ranking engine 208 and/or the data store 206.

Figure 3:
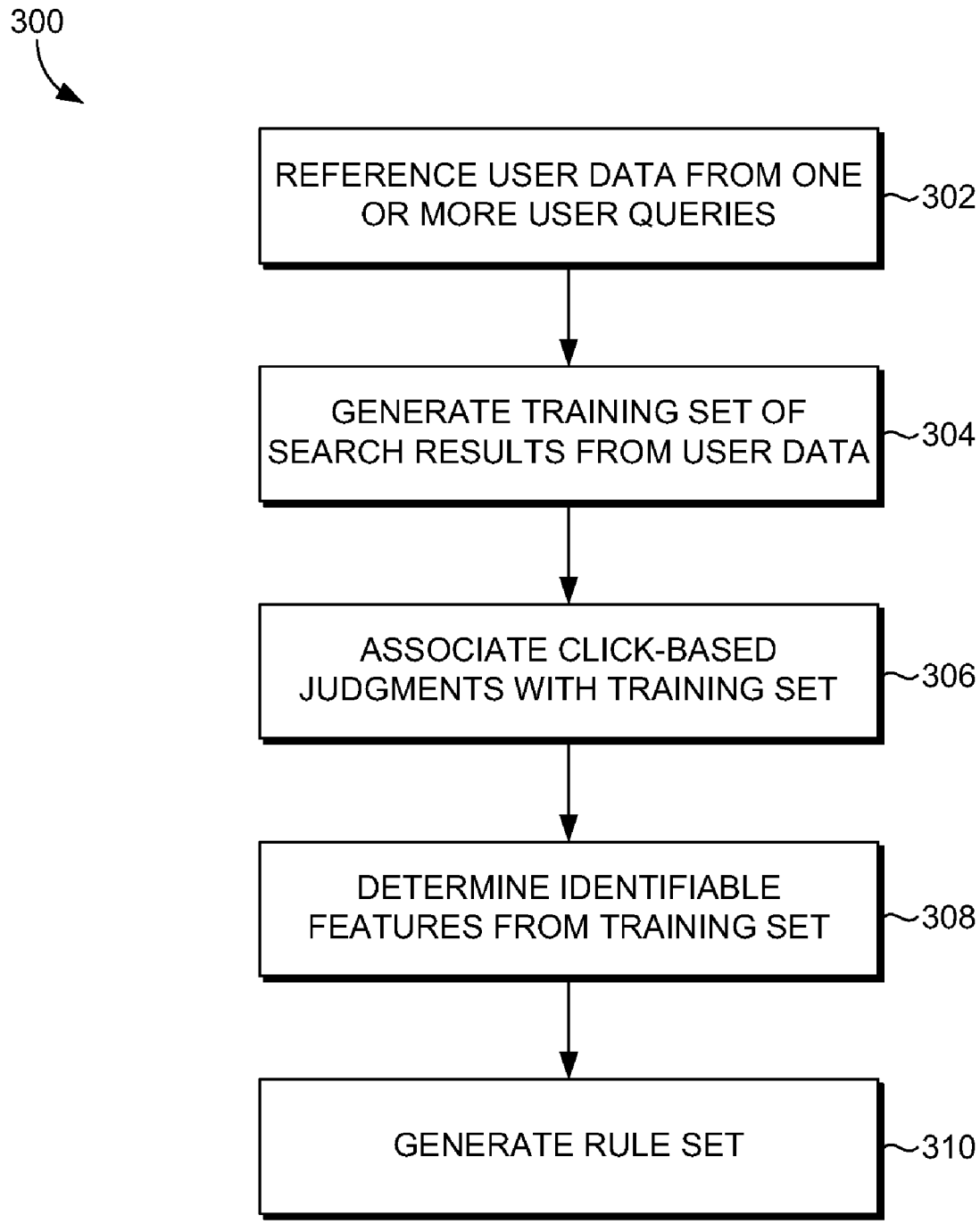
FIGS. 3-5 are flow diagrams showing a method for ranking search results using click-based data for use in accordance with embodiments of the present invention.

Turning now to FIG. 3, a flow diagram is provided that illustrates a method 300 for ranking search results using click-based judgments. As shown at block 302, user data is referenced from one or more user queries. The referenced user data may include search results generated by a general search engine and/or a vertical search engine. At block 304, a training set of search results from the user data is generated. The training set created at block 304 may include only vertical search results, only general search results, or may include both general and vertical search results. Click-based judgments are associated with the search results in the training set at block 306. Click-based judgments may be elicited from a single judge, or a group of judges, that are presented with a single or multiple training sets of user data. At block 308, identifiable features are determined for the training set. Such identifiable features may include clicks on only textual search results, clicks on vertical search results, clicks on captions and URLs of query-URL pairs, query classification confidence, vertical query confidence, overall clicks on the entire webpage, clicks on advertisements, clicks on links to see the next page of results, and other features of user queries identified based on click-based judgments.

In embodiments, particular click-based judgment may be associated with each identifiable feature. For instance, for the user query "movies," an identifiable feature for "vertical query confidence" may be identified using click-based judgments. Such an identifiable feature may indicate a user's preference for vertical query results over general, textual results, for the query "movies." The identifiable feature "vertical query confidence" may then be associated with a particular click-based judgment such that the appropriate weight will be given to that particular feature. As previously discussed, associating a particular click-based judgment with an identifiable feature may include appending an absolute numerical value to the click-based judgment such that a rule set for that user query would include numerical indications of user preferences. Here, with an identifiable feature of "vertical query confidence," based on click-based data indicating a strong preference for vertical search results, a particular click-based judgment may be assigned to that particular feature.

At block 310, a rule set is generated. This rule set may include the identifiable features of a user query, as determined based on click-based judgments. It should be understood that a single or multiple identifiable features may be determined for a single user query. For example, for the user query "movies," multiple features may be identified from the training set of search results for that user query. As such, a rule set generated from identifiable features based on click-based judgments may relate to different aspects of a user's preference for the same user query.

Figure 4:
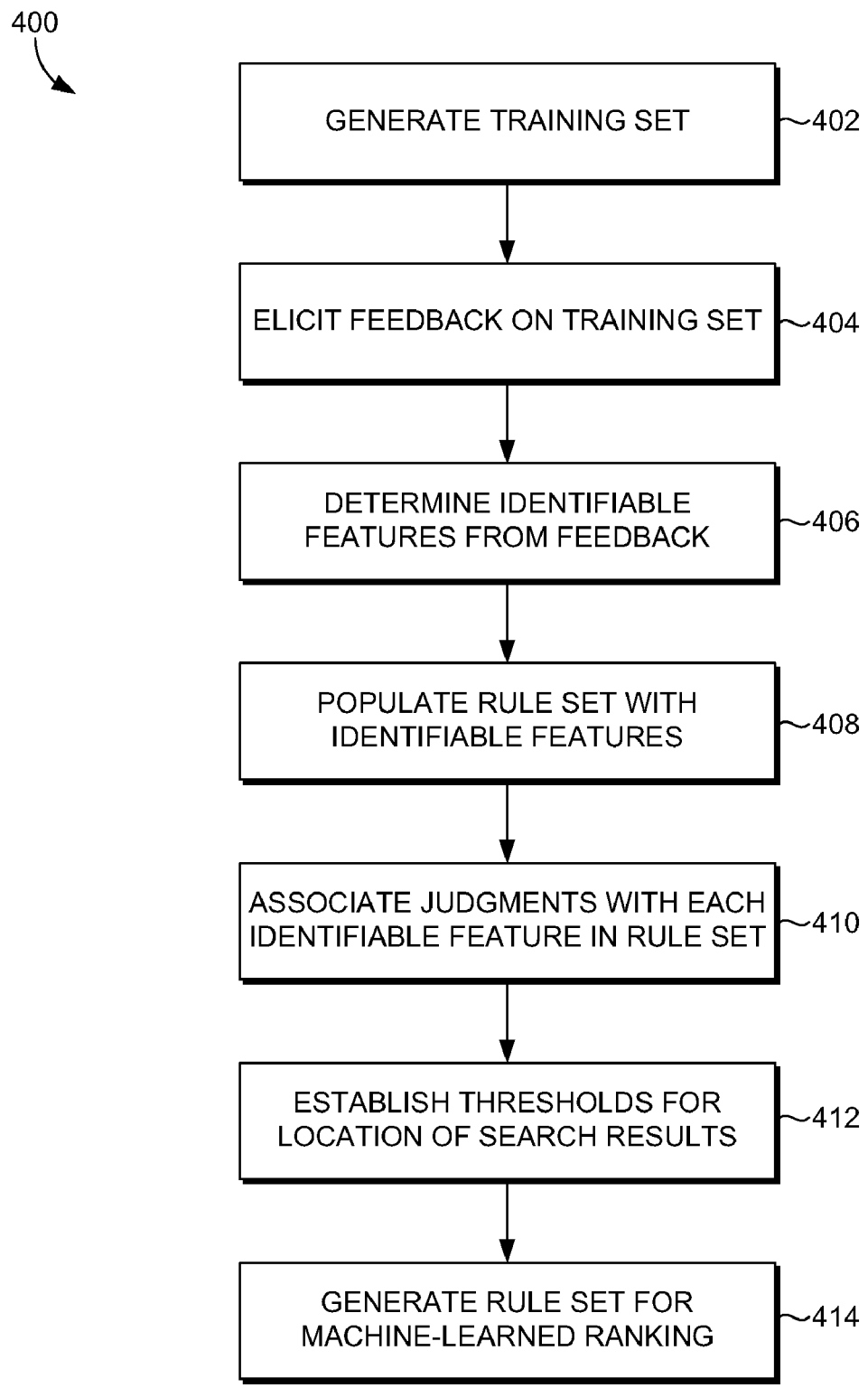

Referring next to FIG. 4, a flow diagram is provided that illustrates a method 400 performed by a server upon initiation of a request for ranked results. As shown at block 402, a training set is generated for one user query or multiple user queries. As previously discussed, such training set may include search results of one or both of general search engine results or vertical search engine results. At block 404, feedback is elicited on a training set. Such feedback may be click-based judgments, human-based judgments, or both. In embodiments, the proportion of human-based judgments and click-based judgments associated with a training set may be adjusted using the following equation:

$$TOTAL = (\alpha)X + (1-\alpha)Y$$

In the equation above, the value of $\alpha$ is adjusted between 0 and 1, which in turn adjusts the proportion of each type of judgment for the "TOTAL" search results in a training set. As used herein, "X" refers to human-based judgments associated with one or more search results in the training set. The term "Y" represents click-based judgments associated with one or more search results in the training set. In embodiments, the proportions of click-based and human-based judgments may be adjusted based on the type of search results being ranked and the availability of human judges from whom to elicit such judgments. For example, where click-based judgments are readily available, the proportion of click-based judgments may be increased relative to the amount of human-based judgments. Alternatively, where collecting click-based judgments may prove costly and inefficient, human-based judgments may be assigned to the particular user query and the proportion of human-based judgments increased relative to click-based judgments.

At block 406, identifiable features are determined based on feedback from judges. At block 408, a rule set is populated with identifiable features. Such identifiable features are then associated with judgments at block 410. The judgments associated with identifiable features at block 410 may include specific click-based judgments or specific human-based judgments, depending on the proportion of each associated with the training set. At block 412, thresholds are established for the location of search results. As used herein, "location" refers to any position of a ranked search result when presented to a user. For instance, if a particular click-based judgment associated with an identifiable feature at block 410 indicates a user's preference for image results, a threshold may be established to direct the placement of image results for that user query near the top of a list of ranked search results. As such, in applying the rule set to subsequent user queries for the same term, image search results may be located near the top of the search results page according to the satisfied threshold.

At block 414, a rule set is generated for implementation in machine-learned ranking. Such a rule set may include the identifiable features of block 408, the associated judgments of block 410, and the established thresholds of block 412. Machine-learned ranking refers to the automatic ranking of search results as implemented in a machine-learned model.

As such, a rule set derived from a training set of previously generated search results for a particular user query may be subsequently used in machine-learned ranking to present ranked search results for the same or similar user query.

Figure 5:
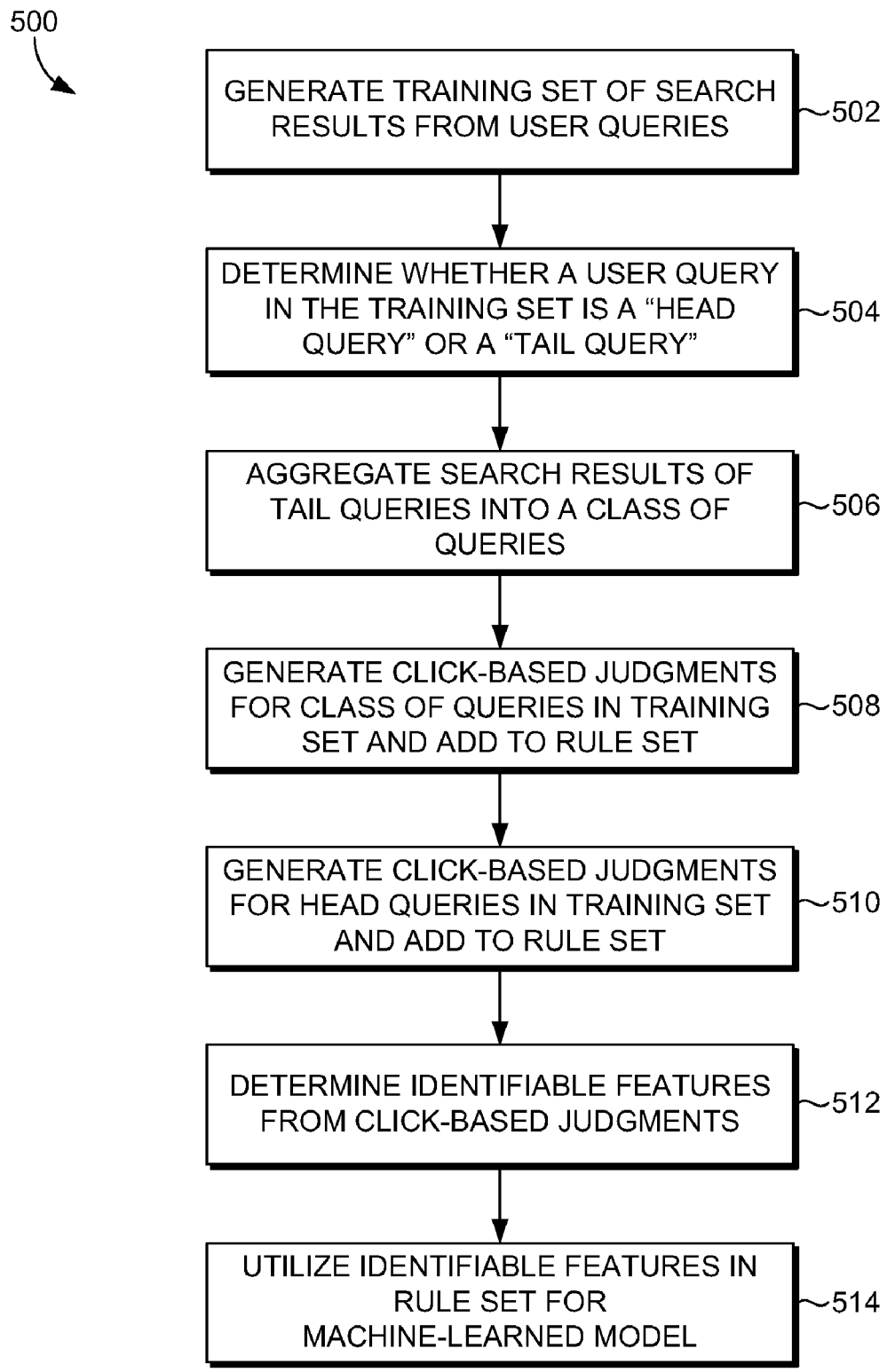

With reference now to FIG. 5, a flow diagram is provided that illustrates a method 500 for ranking search results using click-based judgments. At block 502, a training set is generated from search results of user queries. Based on satisfying established thresholds, a determination is made at block 504 whether a user query in the training set is a "head" query or a "tail" query. For instance, a training set of data may include data from a single user query for the term "movies." Based on satisfying established thresholds, the user query "movies" may be categorized as either a "head query" or a "tail query." At block 506, the search results of tail queries are aggregated into a class of queries. Click-based judgments are generated for the class of queries at block 508, and added to a rule set. As shown at block 510, click-based judgments for head queries are generated and added to the rule set. Identifiable features are determined from the click-based judgments at block 512. Such identifiable features are utilized in a rule set for a machine-learned model at block 514.

Figure 6:
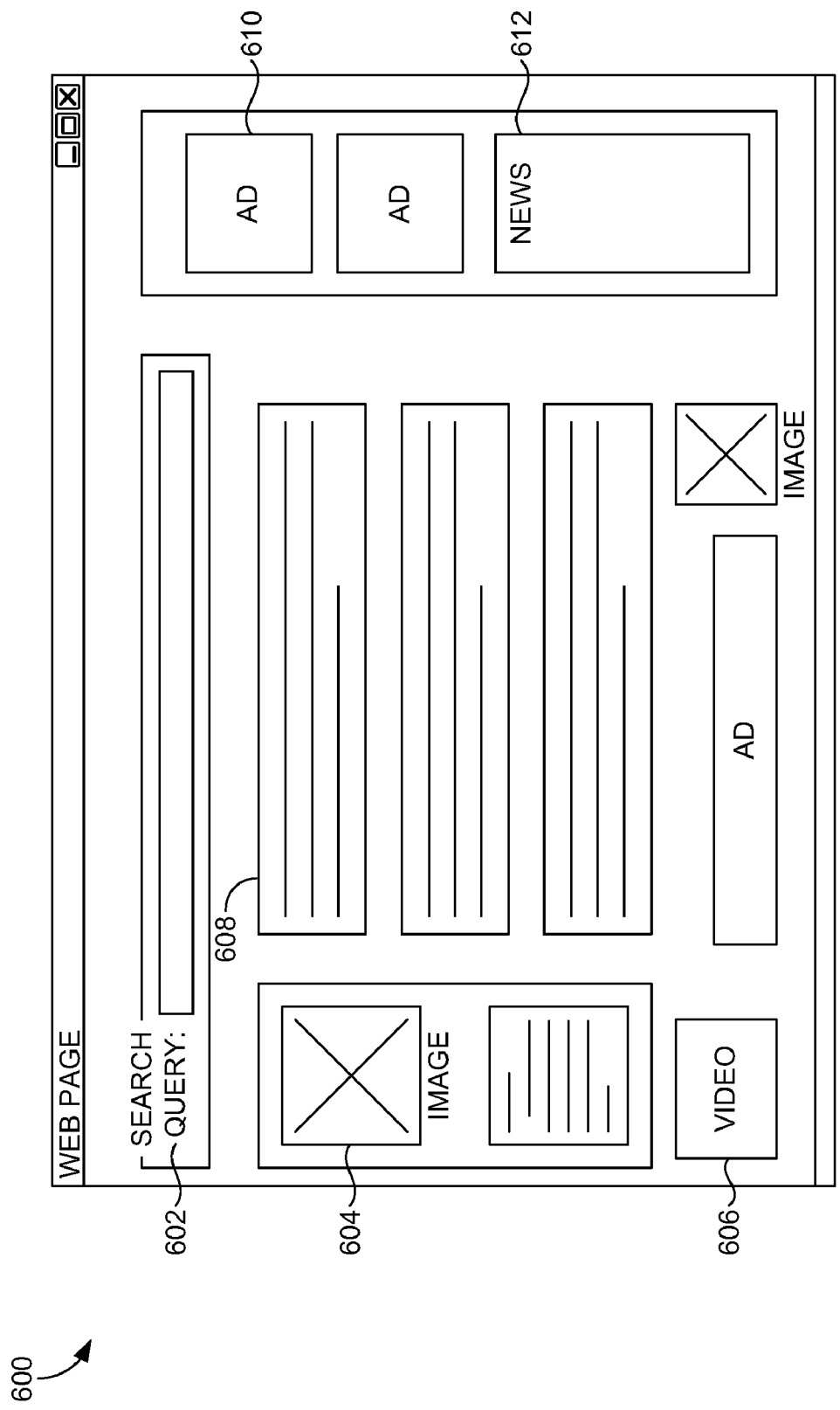
FIGS. 6-7 are illustrative screen displays showing search results displayed in accordance with embodiments of the present invention.

Referring to FIG. 6, an illustrative screen display 600 for presenting ranked search results is shown. Screen display 600 generally includes query 602, image result 604, video result 606, textual search result 608, advertisement 610, and news item 612. Screen display 600 generally depicts the presentation of ranked search results using click-based judgments. Image result 604 and video result 606 are examples of vertical search engine results that may be presented in response to a user query entered into query 602. Textual search result 608 is an example of a search result retrieved from a general search engine and presented in response to a user query entered into query 602. Click-based judgments regarding a user's preferences for vertical search results and general search results may be used to determine the placement of such results in screen display 600. Similarly, the selection and ranking of search results in screen display 602 may be based on click-based judgments from a training set of data generated with search results for the same user query.

Figure 7:
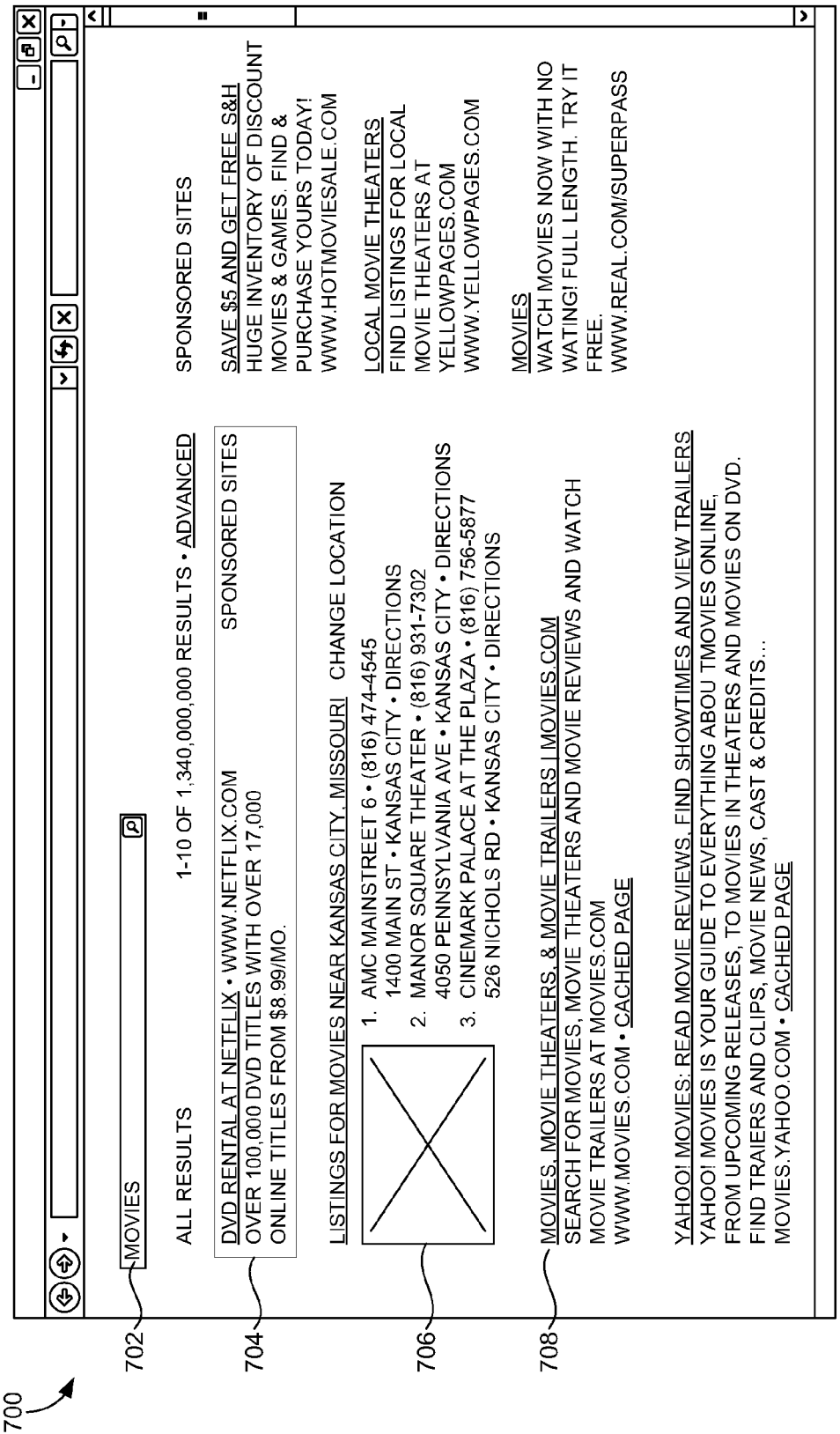

With reference now to FIG. 7, an illustrative screen display 700 for presenting ranked search results is shown. Screen display 700 generally includes user query 702, query-URL result 704, image result 706, and general textual result 708. The ordering of query-URL result 704, image result 706, and general textual result 708 as presented on screen display 700 may be determined by a machine-learned model. As previously discussed, the machine-learned model may implement a rule set derived from the identifiable features of a training set of user data.

As can be understood, embodiments of the present invention provide a method of generating a machine-learned model for ranking search results using click-based data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable media storing computer-useable instructions that, when used by one or more computing devices, causes the one or more computing devices to perform a method of generating a machine-learned model for ranking search results using click-based data comprising:
   referencing data from one or more user queries, wherein the data is referenced from one or more of a general search engine and a vertical search engine;
   generating a training set of data, wherein the training set comprises one or more search results extracted from the data;
   associating one or more click-based judgments with each of the one or more search results in the training set, wherein associating one or more click-based judgments with each of the one or more search results in the training set comprises:
      (1) determining that a plurality of queries are tail queries, wherein a tail query satisfies a threshold for the data referenced from one or more queries;
      (2) aggregating the search results of the plurality of tail queries into one or more classes of tail queries, such that the training set comprises at least one class of tail queries having a plurality of tail queries; and
      (3) associating one or more click-based judgments with each of the one or more classes of tail queries in the training set;
   based on associating one or more click-based judgments with each of the one or more search results in the training set, determining one or more identifiable features from the training set; and
   based on determining one or more identifiable features, generating a rule set for ranking subsequent search results of one or more user queries.

2. The one or more computer-readable media of claim 1, wherein the one or more search results extracted from the data comprises one or more of general search engine results and vertical search engine results.

3. The one or more computer-readable media of claim 1, wherein associating one or more click-based judgments with each of the one or more search results in the training set comprises:
   determining that one or more user queries is a head query, wherein a head query satisfies a threshold for the data referenced from one or more user queries; and
   associating one or more click-based judgments directly with each of the one or more search results of the one or more head queries in the training set.

4. The one or more computer-readable media of claim 1, wherein associating one or more click-based judgments with each of the one or more search results in the training set comprises:
   receiving click-based judgments from one or more human judges, wherein the click-based judgments correspond to user preferences regarding one or more of the plurality of search results in the training set.

5. The one or more computer-readable media of claim 4, wherein receiving click-based judgments from one or more human judges comprises:
   presenting one or more human judges with the training set; and
   generating a corresponding set of click-based judgments based on feedback from one or more human judges regarding each of the one or more search results in the training set.

6. The one or more computer-readable media of claim 1, wherein the one or more identifiable features comprise at least one of clicks on only textual search results, clicks on vertical search results, clicks on captions and URLs of query-URL pairs, query classification confidence, vertical query confidence, overall clicks on the entire webpage, clicks on advertisements, and clicks on links to see the next page of results.

7. The one or more computer-readable media of claim 1, wherein the method further comprises:
   associating a particular click-based judgment with each of the determined one or more identifiable features.

8. The one or more computer-readable media of claim 1, wherein the method further comprises:
   appending an absolute numerical value to each of the one or more identifiable features.

9. The one or more computer-readable media of claim 1, wherein the method further comprises:
   appending an absolute numerical value to each of the one or more click-based judgments, wherein the absolute numerical value is based on a scale of numerical values associated with particular click-based judgments.

10. A method performed by one or more server devices for ranking search results, the method comprising:
    referencing data from one or more user queries, wherein the data comprises one or more of general search engine results and vertical search engine results;
    generating a training set, wherein the training set comprises one or more search results extracted from the data;
    associating one or more click-based judgments with each of the one or more search results in the training set, wherein associating one or more click-based judgments with each of the one or more search results in the training set comprises:
       (1) determining that a plurality user queries are tail queries, wherein a tail query satisfies a threshold for the data referenced from one or more user queries;
       (2) aggregating the search results of plurality of tail queries into one or more classes of tail queries, such that the training set comprises at least one class of tail queries having a plurality of tail queries; and
       (3) associating one or more click-based judgments with each of the one or more classes of tail queries in the training set;
    determining one or more identifiable features from the training set based on the associated one or more click-based judgments; and
    based on determining one or more identifiable features from the training set, generating a rule set for ranking search results.

11. The method of claim 10, wherein associating one or more click-based judgments with each of the one or more search results in the training set comprises:
    determining that one or more user queries is a head query, wherein a head query satisfies a threshold for the data referenced from one or more user queries; and
    associating one or more click-based judgments directly with each of the one or more search results of the one or more head queries in the training set.

12. The method of claim 10, wherein associating one or more click-based judgments with each of the one or more search results in the training set comprises:
    presenting one or more human judges with the training set; and
    generating a corresponding set of click-based judgments based on feedback from one or more human judges, wherein the click-based judgments correspond to user preferences regarding one or more of the plurality of search results in the training set.

13. The method of claim 10, wherein the one or more identifiable features comprise at least one of clicks on only textual search results, clicks on vertical search results, clicks on captions and URLs of query-URL pairs, query classification confidence, vertical query confidence, overall clicks on the entire webpage, clicks on advertisements, and clicks on links to see the next page of results.

14. The method of claim 10, further comprising:
appending an absolute numerical value to each of the one or more identifiable features.

15. The method of claim 10, further comprising:
appending an absolute numerical value to each of the one or more click-based judgments, wherein the absolute numerical value is based on a scale of numerical values associated with particular click-based judgments.

16. The method of claim 10 further comprising:
associating one or more human-based judgments with at least one of the one or more search results in the training set;
determining one or more identifiable features from the training set based on the associated one or more human-based judgments;
based on determining one or more identifiable features, generating a rule set.

17. The method of claim 16 further comprising:
adjusting a proportion of click-based judgments associated with one or more search results and a proportion of human-based judgments associated with one or more search results for a training set using an equation as follows:

$$TOTAL=(\alpha)X+(1-\alpha)Y$$

wherein the value of a is adjusted between 0 and 1;
X represents human-based judgments associated with one or more search results in the training set; and
Y represents click-based judgments associated with one or more search results in the training set.

18. One or more computer-readable media storing computer-useable instructions that, when used by one or more computing devices, causes the one or more computing devices to perform a method for ranking search results using click-based data comprising:
referencing data from one or more user queries, wherein the data is referenced from one or more of general search engines and vertical search engines;
generating a training set of data, wherein the training set comprises a plurality of search results from the data, further wherein the plurality of search results comprises one or more of a general search engine result and a vertical search engine result;
associating one or more click-based judgments with the plurality of search results in the training set based on:
  (1) determining whether one or more user queries is a head query, wherein a head query satisfies a threshold for the data referenced from one or more user queries;
  (2) associating one or more click-based judgments directly with each of the plurality of search results for the one or more head queries in the training set;
  (3) determining whether a plurality of user queries are tail queries, wherein a tail query satisfies a threshold for the data referenced from one or more user queries;
  (4) aggregating the plurality of search results of one or more tail queries into one or more classes of tail queries, such that the training set comprises at least one class of tail queries having a plurality of tail queries; and
  (5) associating one or more click-based judgments with each of the classes of tail queries in the training set;
based on associating the one or more click-based judgments with each of the plurality of search results in the training set, determining one or more identifiable features from the training set, wherein the one or more identifiable features comprise at least one of:
clicks on only textual search results;
clicks on vertical search results;
clicks on captions and URLs of query-URL pairs;
query classification confidence;
vertical query confidence;
overall clicks on the entire webpage;
clicks on advertisements; and
clicks on links to see the next page of results
appending an absolute numerical value to each of the one or more identifiable features;
generating a rule set based on the one or more identifiable features of the one or more user queries; and
utilizing the rule set to rank subsequent search results.

* * * * *